US012219050B2

United States Patent
Marquez et al.

(10) Patent No.: US 12,219,050 B2
(45) Date of Patent: Feb. 4, 2025

(54) PHOTONIC IMPLEMENTATION OF KEYS UPDATE AND HASH GENERATION FOR DIGITAL CURRENCY TRANSACTIONS

(71) Applicant: Milkshake Technology Inc., Menlo Park, CA (US)

(72) Inventors: Bicky A. Marquez, Kingston (CA); Bhavin J. Shastri, Kingston (CA); Douglas H. Wightman, Kingston (CA)

(73) Assignee: Milkshake Technology Inc., Menlo Park, CA (US)

( * ) Notice: Subject to any disclaimer, the term of this patent is extended or adjusted under 35 U.S.C. 154(b) by 225 days.

(21) Appl. No.: 17/991,583

(22) Filed: Nov. 21, 2022

(65) Prior Publication Data

US 2023/0163956 A1    May 25, 2023

Related U.S. Application Data (60) Provisional application No. 63/282,082, filed on Nov. 22, 2021.

(51) Int. Cl.
*H04L 9/08* (2006.01)
*G06E 3/00* (2006.01)
(Continued)

(52) U.S. Cl.
CPC ............ *H04L 9/0825* (2013.01); *G06E 3/005* (2013.01); *G06Q 20/367* (2013.01);
(Continued)

(58) Field of Classification Search
CPC ..... H04L 9/0825; H04L 9/0643; H04L 9/085; H04L 9/0891; H04L 9/0861;
(Continued)

(56) References Cited

U.S. PATENT DOCUMENTS 8,681,982 B2   3/2014 Wiseman et al.
10,924,269 B1   2/2021 Ding et al.
(Continued)

FOREIGN PATENT DOCUMENTS

EP    3506190 A1    7/2019

OTHER PUBLICATIONS

Alipour-Banaei, H., et al., "Photonic crystal based 1-bit full-adder optical circuit by using ring resonators in a nonlinear structure," *Photonics and Nanostructures—Fundamentals and Applications*, vol. 24, May 2017, pp. 29-34.
(Continued)

*Primary Examiner* — Joseph P Hirl
*Assistant Examiner* — Thomas A Gyorfi
(74) *Attorney, Agent, or Firm* — Fenwick & West LLP (57) ABSTRACT

Embodiments of the present disclosure are directed to a photonic implementation of a processor for keys update and hash generation for digital currency (e.g., bitcoin) transactions. The processor includes a first photonic circuit and a second photonic circuit coupled to the first photonic circuit via a set of optical connections. The first photonic circuit is configured to generate a plurality of new messages based at least in part on a plurality of input messages. During a plurality of operational cycles, the second photonic circuit is configured to receive, from the first photonic circuit via the set of optical connections, the plurality of new messages, and update a plurality of keys based at least in part on the received plurality of new messages. The second photonic circuit is further configured to generate at least one hash value based on the plurality of keys generated after the plurality of operational cycles.

20 Claims, 4 Drawing Sheets

(51) Int. Cl.
  *G06Q 20/36* (2012.01)
  *H04L 9/06* (2006.01)
  *G02B 6/12* (2006.01)
(52) U.S. Cl.
  CPC ............ *H04L 9/0643* (2013.01); *H04L 9/085* (2013.01); *H04L 9/0891* (2013.01); *G02B 6/12002* (2013.01); *G02B 6/12004* (2013.01)
(58) Field of Classification Search
  CPC .............. H04L 9/3239; G02B 6/12002; G02B 6/12004; G06Q 20/367; G06E 3/005
  See application file for complete search history.

(56) References Cited

U.S. PATENT DOCUMENTS

| | | | |
|---|---|---|---|
| 11,238,428 B1* | 2/2022 | Nagarajan | G06Q 20/36 |
| 11,251,947 B1* | 2/2022 | Wang | H04L 9/0891 |
| 2020/0327093 A1* | 10/2020 | Nagarajan | G06F 13/364 |
| 2022/0166613 A1* | 5/2022 | Cruz | G09C 5/00 |

OTHER PUBLICATIONS

Chen, H., et al., "100-Gbps RZ Data Reception in 67-GHz Si-Contacted Germanium Waveguide p. i-n Photodetectors," *Journal of Lightwave Technology*, vol. 35, No. 4, pp. 722-726, Feb. 15, 2017, doi: 10.1109/JLT.2016.2593942.

Green, W., et al., "Ultra-compact, low RF power, 10 GB/s silicon Mach-Zehnder modulator," *Optics Express*, vol. 15, No. 25, 2007, pp. 17106-17113.

International Search Report and Written Opinion, Patent Cooperation Treaty Application No. PCT/CA2022/051712, dated Feb. 15, 2023, 8 pages.

International Search Report and Written Opinion, Patent Cooperation Treaty Application No. PCT/CA2022/051713, dated Feb. 23, 2023, 9 pages.

Kumar, A., et al., "All-optical NOT and AND gates based on 2D nonlinear photonic crystal ring resonant cavity," *Optik*, vol. 167, Aug. 2018, pp. 164-169.

Mohebzadeh-Bahabady, A., et al., "Proposal of a Cascade Photonic Crystal XOR Logic Gate for Optical Integrated Circuits with Investigation of Fabrication Error and Optical Power Changes," *Photonics* 2021, vol. 8, Article 392, 13 pages.

Mostafa, T.S., et al., "Ultra-High bit rate all-optical AND/OR logic gates based on photonic crystal with multi-wavelength simultaneous operation," *Journal of Modern Optics*, 2019, vol. 66, Issue 9, pp. 1005-1016.

Tait, A. N., "Quantifying power use in silicon photonic neural networks," arXiv preprint arXiv:2108.04819, 2021, pp. 1-28.

Timurdogan, E., et al., "An ultralow power athermal silicon modulator," *Nature Communications*, vol. 5, Article No. 4008, 2014, pp. 1-11.

Xiao, X., et al., "60 Gbit/s Silicon Modulators with Enhanced Electro-optical Efficiency," in Optical Fiber Communication Conference/National Fiber Optic Engineers Conference 2013, OSA Technical Digest (online) (Optical Society of America, 2013), paper OW4J.3, 3 pages.

Xu, Q., et al., "Silicon microring resonators with 1.5-μm radius," *Optics Express*, vol. 16, No. 6, 2008, pp. 4309-4315.

Caulfield, H.J., et al., "Why future supercomputing requires optics," Nature Photonics, vol. 4, Jan. 2010, pp. 261-263.

Miller, D., "Are optical transistors the logical next step?" Nature Photonics, vol. 4, Jan. 2010, pp. 3-5.

Miller, D., "The role of optics in computing," Nature Photonics, vol. 4, Jan. 2010, p. 406.

Tucker, R.S., "The role of optics in computing," Nature Photonics, vol. 4, Jan. 2010, p. 405.

* cited by examiner

```
┌─────────────────────────────────────────────┐
│ Generate, by a first photonic circuit of a  │
│ photonic processor, a plurality of new      │
│ messages based at least in part on a        │
│ plurality of input messages                 │
│                    405                      │
└─────────────────────────────────────────────┘
                      │
                      ▼
┌─────────────────────────────────────────────┐
│ Receive, at a second photonic circuit of    │
│ the photonic processor during a plurality   │
│ of operational cycles, the plurality of new │
│ messages from the first photonic circuit    │
│ via a set of optical connections            │
│                    410                      │
└─────────────────────────────────────────────┘
                      │
                      ▼
┌─────────────────────────────────────────────┐
│ Update, by the second photonic circuit      │
│ during the plurality of operational cycles, │
│ a plurality of keys based at least in part  │
│ on the received plurality of new messages   │
│                    415                      │
└─────────────────────────────────────────────┘
                      │
                      ▼
┌─────────────────────────────────────────────┐
│ Generate, by the second photonic circuit    │
│ after the plurality of operational cycles,  │
│ at least one hash value based on the        │
│ plurality of keys obtained after the        │
│ plurality of operational cycles             │
│                    420                      │
└─────────────────────────────────────────────┘
```

FIG. 4

PHOTONIC IMPLEMENTATION OF KEYS UPDATE AND HASH GENERATION FOR DIGITAL CURRENCY TRANSACTIONS

CROSS-REFERENCE TO RELATED APPLICATIONS

This application claims a benefit and priority to U.S. Provisional Patent Application Ser. No. 63/282,082, filed on Nov. 22, 2021, which is hereby incorporated by reference in its entirety.

TECHNICAL FIELD

The present disclosure generally relates to a processor architecture, and more specifically to a photonic implementation of keys update and hash generation for digital currency transactions.

BACKGROUND

Computation of hashes may be highly compute intensive using large amounts of processing resources and energy. For example, bitcoin mining is a process that verifies the legitimacy of bitcoin transactions. In bitcoin mining, the SHA (Secure Hash Algorithm)-256 algorithm is used to process blocks of bitcoin transactions and reward mining entities with bitcoins. The SHA-256 algorithm is a highly secure cryptographic protocol with deterministic features. The SHA-256 is used to generate hashes that verify the legitimacy of blocks of transactions. Under certain circumstances, the number of hashes that must be computed to find a hash that will verify a set of bitcoin transactions can increase. Currently, many hashes per second must be generated to validate bitcoin transactions. The compute power required to generate the hashes per unit time (i.e., hash rate) has resulted in a staggering carbon footprint.

SUMMARY

Embodiments of the present disclosure are directed to a photonic implementation of a processor for keys update and hash generation for digital currency (e.g., bitcoin) transactions. The processor includes a first photonic circuit and a second photonic circuit coupled to the first photonic circuit via a set of optical connections. The first photonic circuit is configured to generate a plurality of new messages based at least in part on a plurality of input messages. During a plurality of operational cycles, the second photonic circuit is configured to receive, from the first photonic circuit via the set of optical connections, the plurality of new messages, and update a plurality of keys based at least in part on the received plurality of new messages. The second photonic circuit is further configured to generate at least one hash value based on the plurality of keys generated after the plurality of operational cycles.

Embodiments of the present disclosure are further directed to a non-transitory computer-readable storage medium comprising stored thereon executable instructions that, when executed by at least one processor, cause the at least one processor to: instruct a first photonic circuit of the photonic processor to generate a plurality of new messages based at least in part on a plurality of input messages; initiate, at a second photonic circuit of the photonic processor during a plurality of operational cycles, reception of the plurality of new messages from the first photonic circuit via a set of optical connections; instruct, during the plurality of operational cycles, the second photonic circuit to update a plurality of keys based at least in part on the received plurality of new messages; and instruct, after the plurality of operational cycles, the second photonic circuit to generate at least one hash value based on the plurality of keys obtained after the plurality of operational cycles.

Embodiments of the present disclosure are further directed to a method for photonic-based keys update and hash generation for digital currency (e.g., bitcoin) transactions. The method comprises: generating, by a first photonic circuit of a photonic processor, a plurality of new messages based at least in part on a plurality of input messages; receiving, at a second photonic circuit of the photonic processor during a plurality of operational cycles, the plurality of new messages from the first photonic circuit via a set of optical connections; updating, by the second photonic circuit during the plurality of operational cycles, a plurality of keys based at least in part on the received plurality of new messages; and generating, by the second photonic circuit after the plurality of operational cycles, at least one hash value based on the plurality of keys obtained after the plurality of operational cycles.

The figures depict embodiments of the present disclosure for purposes of illustration only. One skilled in the art will readily recognize from the following description that alternative embodiments of the structures and methods illustrated herein can be employed without departing from the principles, or benefits touted, of the disclosure described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that can be employed without departing from the principles of what is claimed.

Reference will now be made in detail to several embodiments, examples of which are illustrated in the accompanying figures. It is noted that wherever practicable similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Embodiments of the present disclosure are directed to a hardware architecture implemented using photonic circuits that can significantly increase the energy efficiency (e.g., hashes per Watt) while simultaneously increasing a hash rate (e.g., hashes per second) and decreasing a die area. This is achieved by implementing a secure hash algorithm (SHA, e.g., SHA-256) "all-optically"—using pulses of light or continuous-wave (CW) light sources implemented on a silicon photonics platform. A high throughput in the disclosed photonic architecture can be achieved by exploiting a high bandwidth, high switching speed, and low latency offered by optical interconnects, photonic devices, passive photonic logic gates, time-division multiplexing techniques, and wavelength-division multiplexing techniques. Additionally or alternatively, the mode-division multiplexing techniques may be utilized. Note that these elements and techniques can also contribute to high throughputs in central processing unit (CPU) processors, machine learning (ML) processors, graphics processing unit (GPU) processors, and/or more general photonic information processors that require binary logic.

The small footprint (and hence high compute density) and low power consumption may be enabled by implementing all-optical logic with passive devices (e.g., photonic crystals or inverse-designed gates), and three-dimensional waveguides designed on silicon based or silicon nitride based dual layer wafers. Note that these elements and techniques can also contribute to high throughputs in CPU processors, ML processors, GPU processors and/or more general photonic information processors that require binary logic. The disclosed photonic architecture does not require any memory to store data and thus overcomes the need of data convertors (e.g., analog-to-digital convertors (ADCs) or digital-to analog convertors (DACs)) that have traditionally been a bottleneck for optical information processing. The design of photonic architecture presented herein is enabled by advances in foundry-compatible silicon photonics that has recently progressed to the level of sophistication required for large-scale integration. Silicon photonics leverages scaling advancements and technology leaps in complementary metal-oxide-semiconductor (CMOS) monolithic integration, flip-chip heterogeneous integration, or direct wire-bonding, driven by commercial sector progress.

The photonic architecture presented herein provides solutions to several challenging requirements. For example, the requirement for low-latency processing is fulfilled herein by the implementation of hash algorithm all-optically while utilizing passive photonic logic with small area (e.g., photonic crystals or inverse-designed gates). The requirement for high-bandwidth and throughput processing is fulfilled herein by implementing the SHA-256 algorithm all-optically while utilizing wavelength-division and time-division multiplexing techniques. Additionally, the use of digital memory and hence the use of data convertors (e.g., DACs and ADCs) is avoided. The requirement for low static and dynamic power consumption is fulfilled herein by utilizing passive photonic logic (i.e., photonic crystals or inverse-designed gates) and optical interconnects (waveguides).

The requirement of low chip/die area for high processing throughput (i.e., high compute density, and large number of operations per second per unit area) is fulfilled herein by utilizing wavelength-division and time-division multiplexing, three-dimensional waveguides (e.g., designed on silicon based or silicon nitride based dual layer wafers), and small area photonic components (e.g., photonic crystals or inverse-designed gates). Additionally or alternatively, the mode-division multiplexing techniques may be utilized. Note that these elements and techniques can also contribute to high throughputs in CPU processors, ML processors, GPU processors and/or more general photonic information processors that require binary logic. Photonic computing is inherently analog; however, SHA algorithms require digital processing. This requirement is fulfilled herein by utilizing purely photonic digital logic to overcome the need to use data convertors. The requirement for low-loss information processing is fulfilled herein by utilizing low-loss optical interconnects (e.g., silicon or silicon nitride interconnects) and passive photonic logic. The requirement for increased processing throughput is fulfilled herein by recalculating the Merkle root entirely within optical logic gates (without utilizing memory and data convertors), thus enabling computation of more hashes per unit of information.

Pipeline Photonic Architecture and Secure Hash Algorithm

Figure 1:
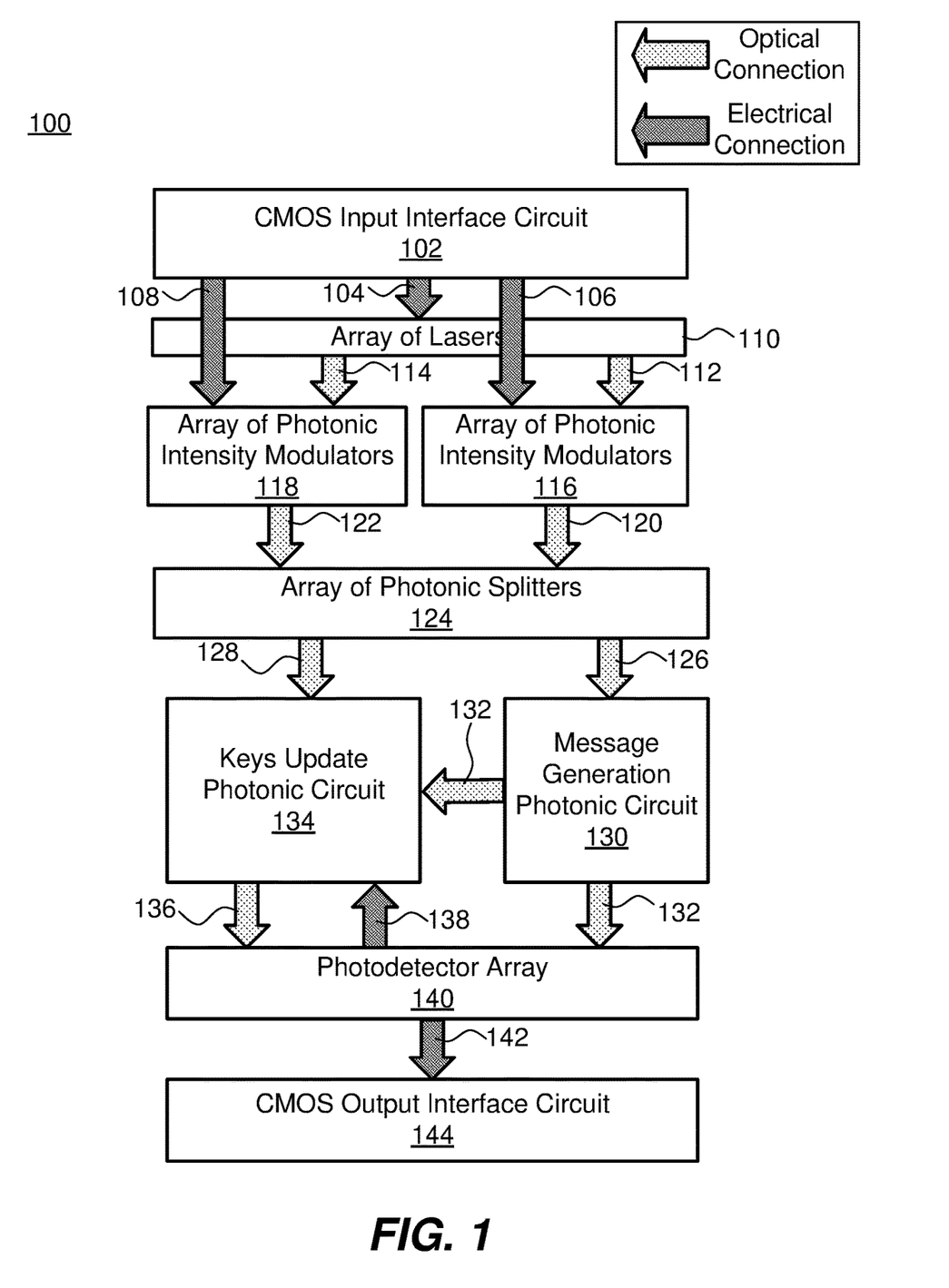
FIG. 1 illustrates an example pipeline photonic architecture of a processor for execution of a secure hash algorithm, in accordance with some embodiments

FIG. 1 illustrates an example pipeline photonic architecture of a processor 100 for execution of SHA algorithm, in accordance with some embodiments. The processor 100 may include a CMOS input interface circuit 102 (e.g., field-programmable gate array (FPGA)), an array of lasers 110, an array of photonic intensity modulators 116, an array of photonic intensity modulators 118, an array of photonic splitters 124, a message generation photonic circuit 130, a keys update photonic circuit 134, a photodetector array 140, and a CMOS output interface circuit 144 (e.g., FPGA). The processor 100 may include fewer or additional components not shown in FIG. 1. The processor 100 may be configured for execution of, e.g., the SHA-256 algorithm or some other SHA-based algorithm.

The CMOS input interface circuit 102 may provide electrical (i.e., digital) input data 104 to the array of lasers 110. The input data 104 may be, e.g., 512-bit digital input from a block header. The block header may be received at the processor 100 from, e.g., a digital network. The input data 104 may include digital values (i.e., bit sequences) associated with input messages and initial key values. The array of lasers 110 may generate optical input data 112 and 114 based on the digital input data 104. The optical input data 112 may include optical data for the input messages, and the optical input data 114 may include optical data for the initial key values. The optical input data 112 may be provided to the array of photonic intensity modulators 116. On the other hand, the optical input data 114 may be provided to the array of photonic intensity modulators 118.

In addition to the optical input data 112, the array of photonic intensity modulators 116 may receive electrical (i.e., digital) input data 106 directly from the CMOS input interface circuit 102. The digital input data 106 may include digital data associated with the input messages obtained from, e.g., the digital network. In addition to the optical input data 114, the array of photonic intensity modulators 118 may receive electrical (i.e., digital) input data 108 directly from the CMOS input interface circuit 102. The digital input data 108 may include digital data associated with the initial key values obtained from, e.g., the digital network. The array of photonic intensity modulators 116 may generate optical data 120 based on the optical input data 112 and the digital input data 106. Similarly, the array of photonic intensity modulators 118 may generate optical data 122 based on the optical input data 114 and the digital input data 108. Each of the array of photonic intensity modulators 116, 118 may be implemented as: an array of electro-optic effect modulators, an array of carrier-depletion effect modulators, an array of thermo-optic effect modulators, other type of photonic intensity modulators, or some combination thereof. The array of electro-optic effect modulators may be implemented as, e.g., an array of Mach-Zehnder modulators. The array of carrier-depletion effect modulators may be implemented as, e.g., an array of micro-disk modulators, an array of nanobeam modulators, and/or an array of micro-ring modulators.

The optical data 120, 122 generated by the array of photonic intensity modulators 116, 118 may be passed onto the array of photonic splitters 124. The array of photonic splitters 124 may split the optical data 120 into a plurality of input messages 126 of a defined size (e.g., 32 bits). Additionally, the array of photonic splitters 124 may split the optical data 122 into a set of initial key values 128. The input messages 126 may be passed onto the message generation photonic circuit 130, whereas the set of initial key values 128 may be passed onto the keys update photonic circuit 134. Driving voltages applied to the array of photonic intensity modulators 116, 118 may allow for the input messages 126 and the initial key values 128 to be input to passive circuits (i.e., the message generation photonic circuit 130 and the keys update photonic circuit 134) composed of photonic splitters, multiplexers, couplers, photonic crystals, inverse-designed gates, etc.

The input messages 126 passed onto the message generation photonic circuit 130 may comprise a set of input messages, $W_i$, where $i \in [0, M-1]$ (e.g., M=16). Each input message 126 may be composed of B bits (e.g., 32 bits). Based on the received input messages 126, the message generation photonic circuit 130 may generate a set of output messages 132, $W_i$, where $i=M, \ldots, M+Q-1$ (e.g., Q=48). Thus, a total of Q+M=R messages (e.g., R=64 messages) may be provided to the keys update photonic circuit 134 before at least one resultant hash value 142 is completed. The message generation photonic circuit 130 may generate the set of output messages 132 as:

$$W_{ii} = \sigma_1(W_{i-2}) + W_{i-7} + \sigma_0(W_{i-15}) + W_{i-16}; i \in [M, R-1], \quad (1)$$

where, $$\sigma_1(x) = \text{Rot}(x,7) \oplus \text{Rot}(x,18) \oplus \text{Sh}(x,3), \quad (2)$$

$$\sigma_0(x) = \text{Rot}(x,17) \oplus \text{Rot}(x,19) \oplus \text{Sh}(x,10), \quad (3)$$

$\text{Rot}(x, \tau)$ is a right rotation of x by $\tau$ bits, $\text{Sh}(x, \tau)$ is a right shift of x by $\tau$ bits, and $\oplus$ represents an XOR operation.

The number of hash values 142 that can be generated in parallel by the processor 100 may be defined by the number of optical wavelengths $\lambda_j$ (j=1, ..., N) that can be fitted within a free spectral range (FSR) of the array of photonic intensity modulators 116 at least a portion of which are implemented as, e.g., an array of micro-ring modulators. Each optical wavelength $\lambda_j$ (j=1, ..., N) may be associated with a respective hash value 142. For a given total number of messages, R (e.g., total of R=64 messages) and initial M messages (e.g., M=16 initial messages), the message generation photonic circuit 130 may generate the remaining Q messages $W_i$ (e.g., Q=48 remaining messages) according to equation (1).

The array of photonic intensity modulators 116 are used to input messages (e.g., as part the optical input data 112 and digital input data 106) with which new messages (e.g., the output messages 132) are generated at the message generation photonic circuit 130. An input string from the block header (e.g., input data 104 and input data 106) may be fixed for, e.g., $2^{32}$ hash values 142 that are generated per block header obtained from the digital network. Each hash value 142 may be different from one another due to the nonce increment that is typically between 0 and $2^{32}$. The nonce increment, as well as the input string, may be expressed in binary numbers. The nonce increments may be concatenated to the input messages 126 (e.g., one nonce increment per input message 126), which may be followed by zero padding. For each of the $2^{32}$ hash values 142 that may be generated per block header, a further increment in the timestamp referred as "native version rolling" (or "nTime rolling") within the block header from 0 to $2^{16}$ may allow for a total of $2^{48}$ hash values 142 to be completed optically.

In some embodiments, the array of photonic intensity modulators 116 includes an array of Mach-Zehnder modulators and an array of micro-ring modulators. The array of Mach-Zehnder modulators within the array of photonic intensity modulators 116 may be used to input a subset of the messages 126 that do not contain parts of the nonce, i.e., the subset of messages 126 that are constant for every hash value 142. For example, the use of the array of 32×8 Mach-Zehnder modulators within the array of photonic intensity modulators 116 may allow to input the same 32-bit word in N different optical wavelengths. The messages 126 that contain parts of the nonce increments are encoded in optics separately as part of the optical input data 112 input into the array of photonic intensity (resonant) modulators 116. For this to happen, each optical wavelength $\lambda_j$ (j=1, ..., N) implements a different nonce increment. Thus, the array of micro-ring modulators within the array of photonic intensity modulators 116 can be utilized to input portions of the optical input data 112 with the parts of the nonce increments encoded in optics. For example, an array of 32×N micro-ring modulators within the array of photonic intensity modulators 116 may be required to process N nonce increments in parallel. The array of 32×N micro-ring modulators within the array of photonic intensity modulators 116 may allow for the nonce increment from 0 to 100 in binary. To exploit the nonce increments beyond the limit of 100, iterations may be required; otherwise, up to four 32×N micro-ring modulators within the array of photonic intensity modulators 116 can be utilized.

In some embodiments, the message generation photonic circuit 130 receives four input messages 126 during each operational cycle of the message generation photonic circuit 130. Two rotations and one shift operation may need to be completed for two of these four input messages 126 at the message generation photonic circuit 130 before an interaction with other two input messages 126 via addition occurs. The rotations and shift operations represent rearrangements of original binary sequences of the input messages 126 that may be performed within the message generation photonic circuit 130 by employing either, e.g., a three-dimensional (or dual-layer wafer) layout, crossing devices, or a plurality of photonic wire bonds. Alternatively, a plurality of optical fibers within the message generation photonic circuit 130 may be utilized for performing the rotations and shift operations.

Once the rotations and shift operations are performed, a plurality of XOR photonic circuits of the message generation photonic circuit 130 (e.g., two 32-bit XOR photonic circuits or 64 XOR photonic crystals, or one 32-bit inverse-designed XOR photonic gate) may be utilized to generate the values $\sigma_1(x)$ and $\sigma^0(x)$, as defined in equations (2)-(3). After that, the message generation photonic circuit 130 may employ at least one full photonic adder (e.g., three full photonic adders) to generate each new output message 132 according to equation (1). Each full photonic adder within the message generation photonic circuit 130 may be composed of, e.g., 32 inverse-designed photonic gates. Thus, if there are three full photonic adders within the message generation photonic circuit 130, then 96 inverse-designed photonic gates within the message generation photonic circuit 130 may be utilized to implement the operations in equation (1).

The set of output messages 132 generated by the message generation photonic circuit 130 may be passed onto the keys update photonic circuit 134 as well as to the photodetector array 140. Each new output message 132 generated by the message generation photonic circuit 130 may be saved in the photodetector array 140 (e.g., an array of 32 photodetectors) to be used in a corresponding iteration of updating key values within the keys update photonic circuit 134. The keys update photonic circuit 134 may utilize the set of output messages 132 to iteratively update a set of keys 136, e.g., the set of eight keys A, B, C, D, E, F, G, H. Each key in the set of updated keys 136 may be composed of B bits (e.g., 32 bits). The updated keys 136 may be passed onto the photodetector array 140.

The photodetector array 140 may generate regenerated keys 138 based on the set of updated keys 136. The regenerated keys 138 may be passed onto the keys update photonic circuit 134. This iterative process of updating the set of keys 136 at the keys update photonic circuit 134 may be repeated a pre-determined number of iterations (e.g., I=64 iterations corresponding to a total number R of different messages input into the keys update photonic circuit 134). At the last iteration, the keys update photonic circuit 134 may generate a final set of updated keys 136 passed onto the photodetector array 140.

The keys update photonic circuit 134 may update the set of keys 136 the pre-determined number of times (e.g., I=64 times) before at least one resultant hash value 142 (e.g., 256-bit hash value) is generated. The keys update photonic circuit 134 may perform the following iterative algorithm to generate the updated keys 136 (e.g., updated keys A, B, C, D, E, F, G, H):

$$T_1 = H + \Sigma_1(E) + CH(E,F,G) + K_i + W_i, \quad (4)$$

$$T_2 = \Sigma_0(A) + MAJ(A,B,C), \quad (5)$$

$$H = G, \quad (6)$$

$$G = F, \quad (7)$$

$$H = G, \quad (8)$$

$$F = E, \quad (9)$$

$$E = D + T_1, \quad (10)$$

$$D = C, \quad (11)$$

$$C = B, \quad (12)$$

$$B = A, \quad (13)$$

$$A = T_1 + T_2, \quad (14)$$

where, $$CH(x,y,z) = (x \wedge y) \vee (\neg x \wedge y), \quad (15)$$

$$MAJ(x,y,z) = (x \wedge y) \vee (x \wedge z) \vee (y \wedge z), \quad (16)$$

$$\Sigma_1(x) = Rot(x,2) \oplus Rot(x,13) \oplus Rot(x,22), \quad (17)$$

$$\Sigma_0(x) = Rot(x,6) \oplus Rot(x,11) \oplus Rot(x,25), \quad (18)$$

and $K_i$ is a constant.

While the new messages 132, $W_i$, are being generated at the message generation photonic circuit 130, the process of digesting the messages 132 and updating the key values 136 at the keys update photonic circuit 134 in accordance with equations (4)-(14) occurs in parallel as part of different pipeline stages of the processor 100. In one or more embodiments, initial values of eight keys (e.g., keys A, B, C, D, E, F, G, H) each having B bits (e.g., 32 bits) are input in parallel (e.g., as part of the optical input data 114 and the digital input data 108) using an array of Mach-Zehnder modulators (e.g., 32×8=256 Mach-Zehnder modulators) within the array of photonic intensity modulators 118. A bit sequence corresponding to the initial key values input into the array of Mach-Zehnder modulators of the array of photonic intensity modulators 118 may be split via the array of photonic splitters 124 and passed onto the keys update photonic circuit 134 as the initial key values 128. Since the initial key values 128 remain constant per hash value 142, the initial key values 128 may be encoded (e.g., as part of the optical input data 114 and the optical data 122) in N different optical wavelengths $\lambda_j$ (j=1, ..., N).

It should be noted that keys A and E may require processing within the keys update photonic circuit 134 before interaction with other keys. Furthermore, keys A and E may complete a defined number of rotations (e.g., three rotations) at the keys update photonic circuit 134 before the interaction (e.g., via addition) with the new message 132 from the message generation photonic circuit 130 and the regenerated keys 138 from the photodetector array 140. The rotation operations may be performed at the keys update photonic circuit 134 by utilizing either, e.g., a three-dimensional layout or photonic wire bonds. Alternatively, the keys update photonic circuit 134 may employ a plurality of optical fibers for performing the rotation operations.

Once the rotation operations are performed at the keys update photonic circuit 134, a plurality of XOR photonic circuits (e.g., four 32-bit XOR photonic circuits, 128 XOR photonic crystals, or two 32-bit inverse-designed three-input XOR photonic gates) of the keys update photonic circuit 134 may be used to generate values $\Sigma_0(A)$ and $\Sigma_1(E)$, as defined by equations (17)-(18). Then, the value of $\Sigma_0$ (A) may be added at the keys update photonic circuit 134 (e.g., via a 32-bit full photonic adder) to a value of a majority function (e.g., MAJ (A, B, C)) to obtain the value of $T_2$, as defined by equation (5). Furthermore, the value of $\Sigma_1$ (E) may be added at the keys update photonic circuit 134 (e.g., via a 32-bit full photonic adder) to a value of a choose function (e.g., CH (E, F, G)), as defined in equation (4). To obtain the value of $T_1$, as defined by equation (4), the keys update photonic circuit 134 may add a sum of H, $K_i$ and $W_i$ to the resultant value of addition between the value of the choose function and the value of $\Sigma_1$ (E). Each of the majority function and the choose function may be performed at the keys update photonic circuit 134 by utilizing a corresponding array of photonic circuits (e.g., an array of 32×2=64 inverse-designed photonic gates).

The value of key H may be input (e.g., as part of the optical input data 114 or the digital input data 108) via an array of Mach-Zehnder modulators within the array of photonic intensity modulators 118 (e.g., 32 Mach-Zehnder modulators), and then passed via a portion of the array of photonic splitters 124 onto the keys update photonic circuit 134 as one of the initial key values 128. The constant value $K_i$ and the message 132, $W_i$, may be different for each updated key value 136. Thus, each of the constant value $K_i$ and the message 132, $W_i$, may be input using a corresponding array of micro-ring modulators (e.g., an array of 32×N micro-ring modulators) within the array of photonic intensity modulators 116 and/or the array of photonic intensity modulators 118 before being passed onto the keys update photonic circuit 134. Alternatively, each of the messages 132, $W_i$, may be input using a set of waveguides connected to the message generation photonic circuit 130. The values of H, $K_i$ and $W_i$ may be mutually added and then added to the resultant value of addition between the value of the choose function and the value of $\Sigma_1(E)$ using a set of full photonic adders (e.g., three 32-bit full photonic adders) at the keys update photonic circuit 134 to generate the value of $T_1$ (e.g., 32-bit value), as defined by equation (4).

The value of $T_1$ may be split (e.g., via a photonic splitter of the keys update photonic circuit 134) into two split values, $\sim T_1$, representing approximate values of $T_1$. The first split value, $\sim T_1$, may be added at the keys update photonic circuit 134 (e.g., via a 32-bit full photonic adder) to the previously generated value of $T_2$ to generate a value (e.g., 32-bit value) with which the key A is updated, as per equation (14). The second split value, may be added at the keys update photonic circuit 134 (e.g., via a 32-bit full photonic adder) to the key D to generate another value (e.g., 32-bit value) with which the key E is updated, as per equation (10). The value of key D may be input via an array of Mach-Zehnder modulators (e.g., 32 Mach-Zehnder modulators) within the array of photonic intensity modulators 118, and then passed via a portion of the array of photonic splitters 124 onto the keys update photonic circuit 134 as one of the initial key values 128. The keys update photonic circuit 134 may further include at least one array of photonic splitters to update the remaining keys and generate the full set of updated key values 136 (e.g., updated key values A, B, C, D, E, F, G, H). The set of updated key values 136 may be wired to the photodetector array 140 where the updated key values 136 are stored in the electronic domain (e.g., at an array of 8×32 photodetectors). This process of updating key values may be repeated as many times as the number of messages 132 are available (e.g., 64 times or iterations).

The photodetector array 140 may generate (i.e., detect) at least one resultant hash values 142 using the final set of key values 136. The final set of key values correspond to the set of updated key values 136 at the last iteration (e.g., the $64^{th}$ iteration). The at least one resultant hash values 142 may be then output onto the CMOS output interface circuit 144. The CMOS output interface circuit 144 may compare each resultant hash value 142 with a target value. The processor 100 may generate P resultant hash values 142 per block, where one block is defined by the operations performed by the processor 100.

Example Photonic Processor

Figure 2:
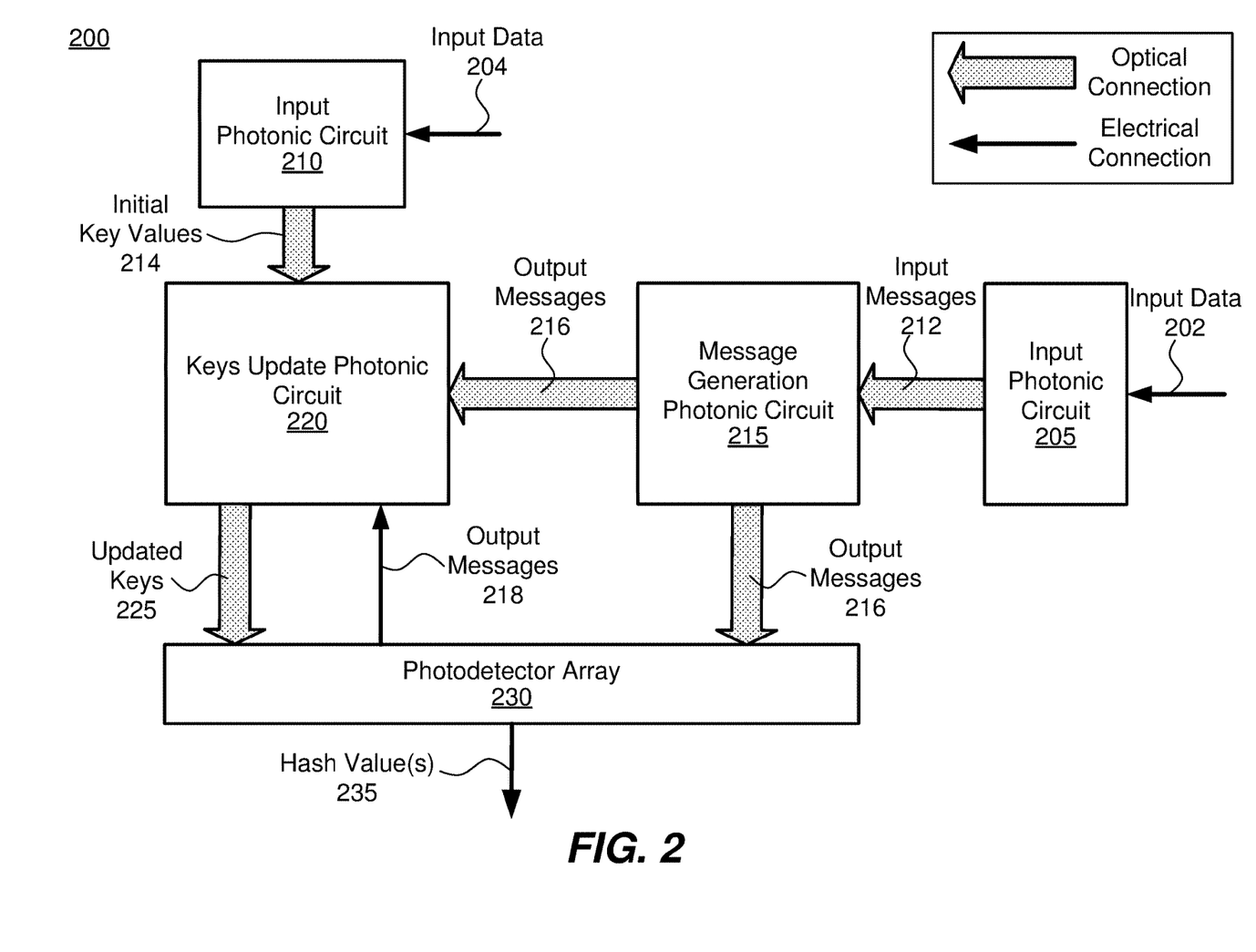
FIG. 2 illustrates an example block diagram of a photonic processor for message generation, keys update and hash generation, in accordance with some embodiments.

FIG. 2 illustrates an example block diagram of a photonic processor 200 for message generation, keys update and hash generation, in accordance with some embodiments. The photonic processor 200 may include an input photonic circuit 205, an input photonic circuit 210, a message generation photonic circuit 215, a keys update photonic circuit 220, and a photodetector array 230. The photonic processor 200 may include fewer or additional components not shown in FIG. 2.

The input photonic circuit 205 may receive input data 202 of a first size (e.g., 512 bits) via a first set of electrical connections. The input data 202 may be a digital data (e.g., a bit sequence) obtained from a digital network (not shown in FIG. 2). In some embodiments, the input photonic circuit 205 encompasses a portion of the array of lasers 110, the array of photonic intensity modulators 116, and a portion of the array of photonic splitters 124. The input photonic circuit 205 may generate a plurality of input messages 212 of a second size (e.g., 32 bits) based at least in part on the received input data 202. A number of the input messages 212 generated by the input photonic circuit 205 may be equal to a ratio of the first size to the second size (e.g., 16 32-bit input messages 212 may be generated). A first portion of the received input data 202 may be associated with a first subset of the input messages 212 that do not comprise parts of a nonce, and a second portion of the received input data 202 may be associated with a second subset of the input messages 212 comprising a plurality of increments of the nonce. The first subset of input messages 212 may include at least one input message 212 received in a plurality of optical wavelengths or optical modes. Each input message 212 in the second subset may include a respective increment of the nonce represented as a respective optical wavelength of the plurality of optical wavelengths.

The input photonic circuit 210 may receive digital input data 204 (e.g., generated by a digital network) via a second set of electrical connections. The input photonic circuit 210 may generate initial key values 214 based at least in part on the received digital input data 204. In some embodiments, the input photonic circuit 210 encompasses a portion of the array of lasers 110, the array of photonic intensity modulators, and a portion of the array of photonic splitters 124. To generate the initial key values 214, input photonic circuit 210 may encode information about the initial key values 214 in a plurality of optical wavelengths or optical modes. The input photonic circuit 210 may transmit the initial key values 214 to the keys update photonic circuit 220 via a fifth set of optical connections.

The message generation photonic circuit 215 may receive the input messages 212 from the input photonic circuit 205 via a first set of optical connections. The message generation photonic circuit may generate a plurality of output messages 216 of the second size based at least in part on the input messages 212. The message generation photonic circuit 215 may generate each output message 216 (or new message) by summing a corresponding pair of processed versions of the input messages 212 and a corresponding pair of the input messages 212. The message generation photonic circuit 215 may comprise a plurality of photonic components configured to generate a subset of the output messages 216 by at least performing rotation and shifting of a subset of the input messages 212. The photonic components of the message generation photonic circuit 215 may include: a plurality of passive or active (e.g., electro-optic) three-dimensional layout components, a plurality of passive or active (e.g., electro-optic) photonic crossing devices, a plurality of photonic wire bonds, a plurality of optical fibers, a plurality of linear or nonlinear (and active or passive) photonic regenerator stages, other type of photonic component, or some combination thereof. The message generation photonic circuit 215 may further include: a plurality of passive or active (e.g., electro-optic) photonic logic gates, a plurality of passive or active (e.g., electro-optic) photonic super-gates, a plurality of passive or active (e.g., electro-optic) photonic logic adders, a plurality of passive or active (e.g., electro-optic) bit corrector gates, other types of photonic gates, or some combination thereof. The photonic super-gates are designed to include the compute for two or more photonic gates that cascade into each other. The bit corrector gates are designed to fix errors (e.g., bit errors) resulting from cascading two or more photonic gates. The message generation photonic circuit 215 may be an embodiment of the message generation photonic circuit 130.

The photodetector array 230 may receive at least a portion of the output messages 216 from the message generation photonic circuit 215 via a second set of optical connections for, e.g., further processing and generation of at least one hash value 235. The photodetector array 230 may further transmit output messages 218 (e.g., digital values or bit sequence) to the keys update photonic circuit 220 via a third set of electrical connections. The photodetector array 230 may be an embodiment of the photodetector array 140.

The keys update photonic circuit 220 may receive, during a plurality of operational cycles, the plurality of output messages 216 from the message generation photonic circuit 215 via a third set of optical connections. The keys update photonic circuit 220 may receive, during each operational cycle, a respective output message 216. In some embodiments, the plurality of output messages 216 may also include the plurality of input messages 212. For example, a total of 64 output messages 216 may be passed onto the keys update photonic circuit 220 during 64 operational cycles (e.g., during 64 iterations at the keys update photonic circuit 220). The keys update photonic circuit 220 may update, during each operational cycle (i.e., during each iteration), a plurality of key values 225, based on at least one output message 216, initial key values 214 and at least one output message 218. The at least one output message 218 may be a digital version (i.e., bit sequence) of the at least one photonic output message 216 passed onto the keys update photonic circuit 220 directly from the message generation photonic circuit 215. While updating the plurality of key values 225 at the keys update photonic circuit 220, the message generation photonic circuit may generate at least one new output message 216. The keys update photonic circuit 220 may update the plurality of key values 225 over a plurality of pipeline stages of the keys update photonic circuit 220 based at least in part on a corresponding subset of the output messages 216 received at each of the plurality of pipeline stages.

During each iteration, the keys update photonic circuit 220 may perform rotation and shifting on a subset of keys (e.g., on the initial key values 214) to generate a rotated subset of keys. The keys update photonic circuit 220 may further perform logical operations on the rotated subset of keys to generate processed key values. The keys update photonic circuit 220 may generate at least one updated key 225 during each iteration by combining at least one of the processed keys and at least one output message 216 received at the keys update photonic circuit 220. The keys update photonic circuit 220 may further split at least one of the processed keys before the updated key 225 is generated.

The keys update photonic circuit 220 may include: a plurality of photonic components, a plurality of passive or active (e.g., electro-optic) photonic logic super-gates, a plurality of passive or active (e.g., electro-optic) photonic regenerator stages, a plurality of photonic logic adder gates, a plurality of passive or active (e.g., electro-optic) bit corrector gates, a plurality of photonic majority logic gates, a plurality of photonic choose logic gates, at least one photonic splitter coupled to at least one of the plurality of the photonic logic adder gates, other type of photonic circuit, or some combination thereof. The plurality of photonic components of the keys update photonic circuit 220 may be implemented as: a plurality of three-dimensional layout components, a plurality of photonic crossing devices, a plurality of photonic logic gates, a plurality of photonic wire bonds, a plurality of optical fibers, other type of photonic component, or some combination thereof. The keys update photonic circuit 220 may be an embodiment of the keys update photonic circuit 134.

After a defined number of iterations (which may correspond to the number of the output messages 216 provided to the keys update photonic circuit 220), the photodetector array 230 may receive final values of the updated keys 225 from the keys update photonic circuit 220 via a fourth set of optical connections. The photodetector array 230 may generate (i.e., detect) at least one hash value 235 based on the received final values of the updated keys 225.

Example Process Flows

Figure 3:
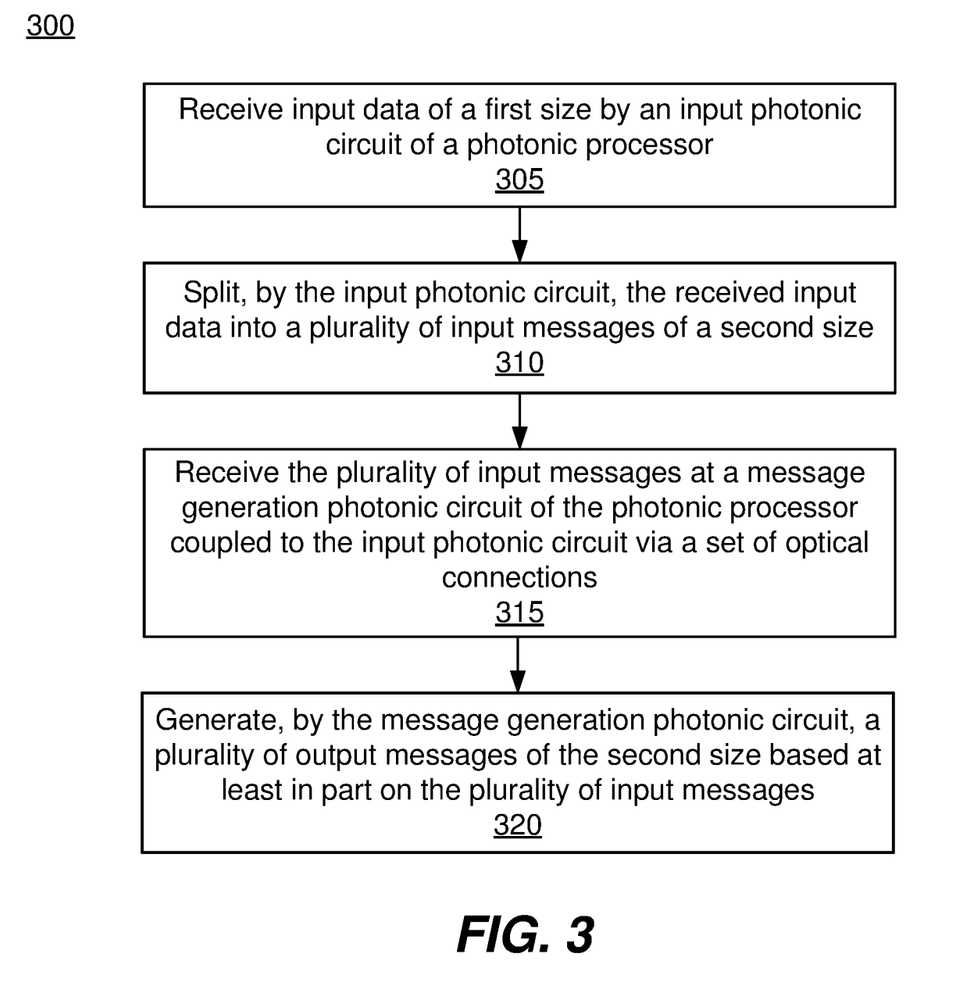
FIG. 3 is a flowchart illustrating an example method for message generation at a photonic processor for digital currency transactions, in accordance with some embodiments.

FIG. 3 is a flowchart illustrating an example method 300 for message generation at a photonic processor for digital currency transactions, in accordance with some embodiments. The operations of method 300 may be performed at, e.g., the processor 100 or the photonic processor 200. The photonic processor may be deployed in a computing system that can further include a non-transitory computer-readable storage medium (e.g., optical, electrical, or electro-optical memory) for storing computer executable instructions and data. The photonic processor may be implemented as a silicon photonics platform.

The photonic processor receives 305 (e.g., via an input photonic circuit) input data of a first size (e.g., 512 bits). The input photonic circuit may comprise an array of photonic intensity modulators configured to receive the input data from an array of lasers. The array of photonic intensity modulators may comprise at least one of: an array of electro-optic effect modulators, an array of carrier-depletion effect modulators, and an array of thermo-optic effect modulators. The array of electro-optic effect modulators may comprise, e.g., an array of Mach-Zehnder modulators. The array of carrier-depletion effect modulators may comprise, e.g., at least one of: an array of micro-disk modulators, an array of nanobeam modulators, and an array of micro-ring modulators.

The photonic processor splits 310 (e.g., by the input photonic circuit) the received input data into a plurality of input messages of a second size (e.g., 32 bits). A number of the plurality of input messages (e.g., 16 input messages) may be equal to a ratio of the first size to the second size. In some embodiments, the input photonic circuit further comprises an array of photonic splitters coupled to the array of photonic intensity modulators. The array of photonic splitters may be configured to receive the input data from the array of photonic intensity modulators, and split the received input data into the plurality of input messages. A first portion of the received input data may be associated with a first subset of the input messages that do not comprise parts of a nonce, and a second portion of the received input data may be associated with a second subset of the input messages comprising a plurality of increments of the nonce. The first subset of input messages may comprise an input message of the plurality of input messages received in a plurality of optical wavelengths or optical modes. Each input message in the second subset may comprise a respective increment of the nonce represented as a respective optical wavelength of the plurality of optical wavelengths.

The photonic processor receives 315 the plurality of input messages at a message generation photonic circuit of the photonic processor coupled to the input photonic circuit via a set of optical connections. The photonic processor generates 320 (e.g., via the message generation photonic circuit) a plurality of output messages of the second size based at least in part on the plurality of input messages. The photonic processor may generate (e.g., via the message generation photonic circuit) an output message of the plurality of output messages by summing a corresponding pair of processed versions of the plurality of input messages and a corresponding pair of the plurality of input messages.

The message generation photonic circuit may comprise a plurality of photonic components configured to generate a subset of the plurality of output messages by at least performing rotation and shifting of a subset of the plurality of input messages. The plurality of photonic components of the message generation photonic circuit may comprise at least one of: a plurality of three-dimensional layout components, a plurality of three-dimensional bit corrector gates, a plurality of photonic crossing devices, a plurality of photonic logic gates, a plurality of photonic wire bonds, a plurality of optical fibers, a plurality of photonic logic super-gates, and a plurality of photonic regenerator stages. The message generation photonic circuit may further comprise at least one of: a plurality of photonic logic adders, a plurality of bit corrector gates, a plurality of photonic logic super-gates, and a plurality of photonic regenerator stages.

In some embodiments, the photonic processor further includes an array of photodetectors coupled to the message generation photonic circuit via a second set of optical connections. The array of photodetectors may be configured to receive the generated output messages via the second set of optical connections for further processing and generation of at least one hash value.

Figure 4:
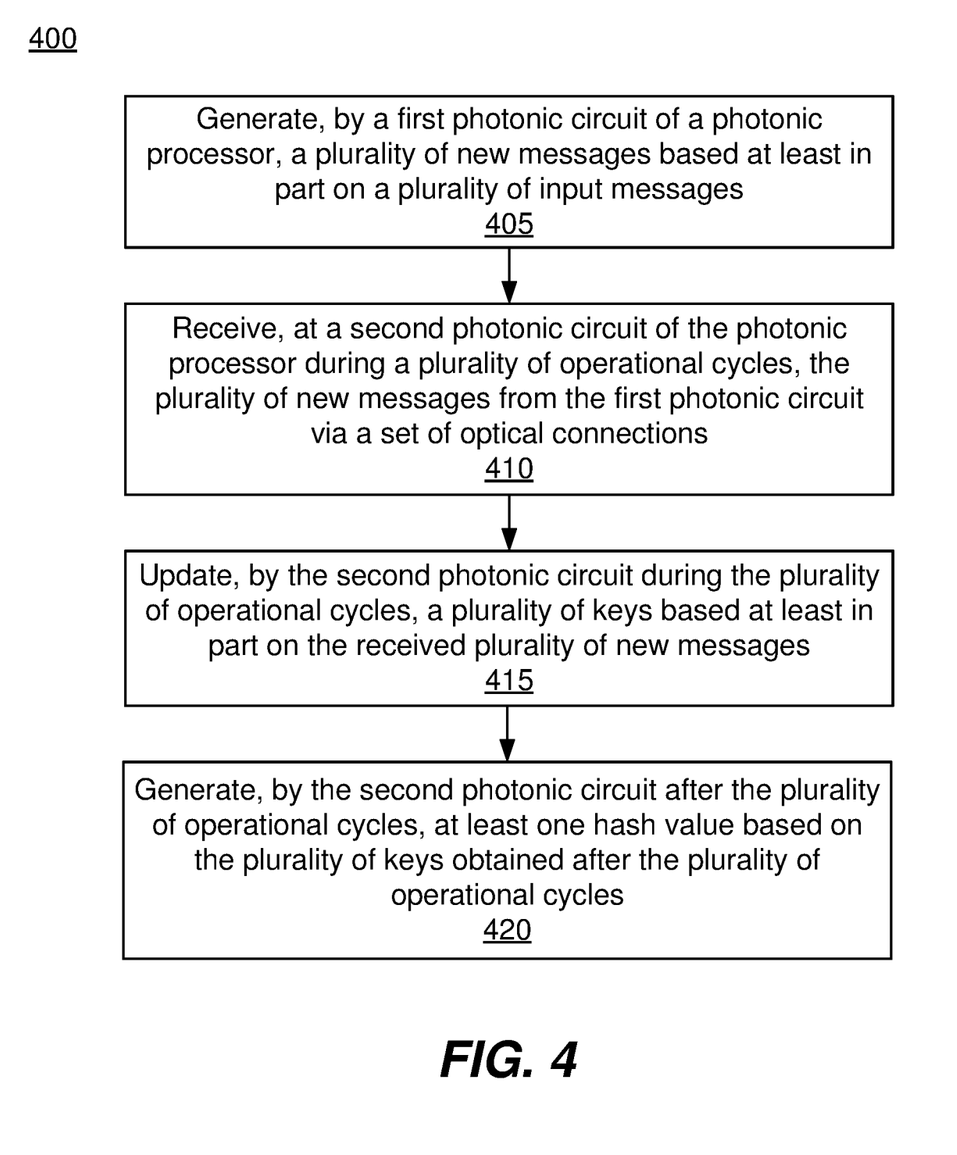
FIG. 4 is a flowchart illustrating an example method for keys update and hash generation at a photonic processor for digital currency transactions, in accordance with some embodiments.

FIG. 4 is a flowchart illustrating an example method 400 for keys update and hash generation at a photonic processor for digital currency transactions, in accordance with some embodiments. The operations of method 400 may be performed at, e.g., the processor 100 or the photonic processor 200. The photonic processor may be deployed in a computing system that can further include a non-transitory computer-readable storage medium (e.g., optical, electrical, or electro-optical memory) for storing computer executable instructions and data. The photonic processor may be implemented as a silicon photonics platform.

The photonic processor generates 405 (e.g., via a first photonic circuit or a message generation photonic circuit) a plurality of new messages based at least in part on a plurality of input messages. The photonic processor receives 410 (e.g., at a second photonic circuit or a keys update photonic circuit), during a plurality of operational cycles, the plurality of new messages from the first photonic circuit via a set of optical connections. The photonic processor updates 415 (e.g., via the second photonic circuit), during the plurality of operational cycles, a plurality of keys based at least in part on the received plurality of new messages. The photonic processor generates 420 (e.g., via the second photonic circuit), after the plurality of operational cycles, at least one hash value based on the plurality of keys obtained after the plurality of operational cycles.

The second photonic circuit may receive, from the first photonic circuit via the set of optical connections during each iteration of a plurality of iterations, a subset of the plurality of new messages. The second photonic circuit may update the plurality of keys based at least in part on the received subset of new messages. The second photonic circuit may generate the at least one hash value based on the plurality of keys obtained after the plurality of iterations. The second photonic circuit may update the plurality of keys based at least in part on the received subset of new messages, while the first photonic circuit generates another subset of the plurality of new messages. The second photonic circuit may be further configured to update the plurality of keys over a plurality of pipeline stages of the second photonic circuit based at least in part on a corresponding subset of the plurality of new messages received at each of the plurality of pipeline stages.

In some embodiments, the photonic processor further includes an array of photodetectors coupled to the second photonic circuit via another set of optical connections, and an interface circuit coupled to the array of photodetectors. The array of photodetectors may be configured to detect the at least one hash value received at the array of photodetectors via the other set of optical connections. The interface circuit may be configured to compare the at least one detected hash value with at least one target value.

In some embodiments, the photonic processor further includes an array of photodetectors coupled to the first photonic circuit via a first set of optical connections and to the second photonic circuit via a first set of electrical connections. The array of photodetectors may be configured to receive at least a portion of the generated new messages from the first photonic circuit via the first set of optical connections, and transmit at least the portion of the received new messages to the second photonic circuit via the first set of electrical connections.

In some embodiments, the photonic processor further includes an array of photonic intensity modulators coupled to the second photonic circuit via another set of optical connections. The array of photonic intensity modulators may be configured to receive at least a portion of initial key values for the plurality of keys, the portion of initial key values encoded in a plurality of optical wavelengths or optical modes, and transmit the received portion of initial key values to the second photonic circuit via the other set of optical connections. The array of photonic intensity modulators may comprise at least one of: an array of electro-optic effect modulators, an array of carrier-depletion effect modulators, and an array of thermo-optic effect modulators The second photonic circuit may be configured to update the plurality of keys by at least performing rotation and shifting of a subset of the plurality of keys to generate a rotated subset of the plurality of keys. The second photonic circuit may be further configured to perform logical operations on the rotated subset of keys to generate a processed subset of the plurality of keys. In some embodiments, the second photonic circuit is configured to generate at least a subset of the updated keys, each updated key in the subset generated by at least combining corresponding processed versions of the plurality of keys and at least one corresponding new message of the received subset of new messages. The second photonic circuit may be further configured to split at least one of the corresponding processed versions of the plurality of keys before the updated key is generated.

The second photonic circuit may comprise at least one of: a plurality of photonic components, a plurality of photonic logic super-gates, a plurality of photonic regenerator stages, a plurality of photonic logic adder gates, a plurality of bit corrector gates, a plurality of photonic majority logic gates, a plurality of photonic choose logic gates, and at least one photonic splitter coupled to at least one of the plurality of the photonic logic adder gates. The plurality of photonic components of the second photonic circuit may comprise at least one of: a plurality of three-dimensional layout components, a plurality of photonic crossing devices, a plurality of photonic logic gates, a plurality of photonic wire bonds, and a plurality of optical fibers.

The photonic processor presented herein provides an increase in energy efficiency while simultaneously increasing a hash rate and decreasing a die area. This is achieved by implementing a secure hash algorithm using photonic circuits on a silicon photonics platform. A high throughput is achieved by exploiting a low latency offered by optical interconnects, photonic devices, passive photonic logic gates, and wavelength-division multiplexing. A high compute density and low power consumption can be achieved by utilizing photonic crystals and waveguides for propagating photonic signals. The photonic processor presented herein does not require any memory to store data and thus overcomes the need of data convertors.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules can be embodied in software, firmware, hardware, or any combinations thereof.

Any of the steps, operations, or processes described herein can be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure can also relate to an apparatus for performing the operations herein. This apparatus can be specially constructed for the required purposes, and/or it can comprise a general-purpose computing device selectively activated or reconfigured by a computer program stored in the computer. Such a computer program can be stored in a non-transitory, tangible computer readable storage medium, or any type of media suitable for storing electronic instructions, which is coupled to a computer system bus. Furthermore, any computing systems referred to in the specification can include a single processor or can be architectures employing multiple processor designs for increased computing capability.

Some embodiments of the present disclosure can further relate to a system comprising a processor, at least one computer processor, and a non-transitory computer-readable storage medium. The storage medium can store computer executable instructions, which when executed by the compiler operating on the at least one computer processor, cause the at least one computer processor to be operable for performing the operations and techniques described herein.

Finally, the language used in the specification has been principally selected for readability and instructional purposes, and it has not been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A photonic processor, comprising:
   a first photonic circuit configured to generate a plurality of new messages based at least in part on a plurality of input messages; and
   a second photonic circuit coupled to the first photonic circuit via a set of optical connections, the second photonic circuit configured, during a plurality of operational cycles, to:
      receive, from the first photonic circuit via the set of optical connections, the plurality of new messages, and
      update a plurality of keys based at least in part on the received plurality of new messages,
   wherein the second photonic circuit is further configured to generate at least one hash value based on the plurality of keys generated after the plurality of operational cycles.

2. The photonic processor of claim 1, wherein the second photonic circuit is further configured to:
   receive, from the first photonic circuit via the set of optical connections during each iteration of a plurality of iterations, a subset of the plurality of new messages;
   update the plurality of keys based at least in part on the received subset of new messages; and
   generate the at least one hash value based on the plurality of keys obtained after the plurality of iterations.

3. The photonic processor of claim 2, wherein the second photonic circuit is configured to update the plurality of keys based at least in part on the received subset of new messages, while the first photonic circuit generates another subset of the plurality of new messages.

4. The photonic processor of claim 1, wherein the second photonic circuit is further configured to update the plurality of keys over a plurality of pipeline stages of the second photonic circuit based at least in part on a corresponding subset of the plurality of new messages received at each of the plurality of pipeline stages.

5. The photonic processor of claim 1, further comprising:
   an array of photodetectors coupled to the second photonic circuit via another set of optical connections, the array of photodetectors configured to detect the at least one hash value received at the array of photodetectors via the other set of optical connections; and
   an interface circuit coupled to the array of photodetectors, the interface circuit configured to compare the at least one detected hash value with at least one target value.

6. The photonic processor of claim 1, further comprising an array of photodetectors coupled to the first photonic circuit via a first set of optical connections and to the second photonic circuit via a first set of electrical connections, the array of photodetectors configured to:
   receive at least a portion of the generated new messages from the first photonic circuit via the first set of optical connections; and
   transmit at least the portion of the received new messages to the second photonic circuit via the first set of electrical connections.

7. The photonic processor of claim 1, further comprising an array of photonic intensity modulators coupled to the second photonic circuit via another set of optical connections, the array of photonic intensity modulators configured to:
receive at least a portion of initial key values for the plurality of keys, the portion of initial key values encoded in a plurality of optical wavelengths; and
transmit the received portion of initial key values to the second photonic circuit via the other set of optical connections.

8. The photonic processor of claim 7, wherein the array of photonic intensity modulators comprises at least one of: an array of electro-optic effect modulators, an array of carrier-depletion effect modulators, and an array of thermo-optic effect modulators.

9. The photonic processor of claim 1, wherein the second photonic circuit is configured to update the plurality of keys by at least performing rotation and shifting of a subset of the plurality of keys to generate a rotated subset of the plurality of keys.

10. The photonic processor of claim 9, wherein the second photonic circuit is further configured to perform logical operations on the rotated subset of keys to generate a processed subset of the plurality of keys.

11. The photonic processor of claim 1, wherein the second photonic circuit is configured to generate at least a subset of the updated keys, each updated key in the subset generated by at least combining corresponding processed versions of the plurality of keys and at least one corresponding new message of a subset of new messages received at the second photonic circuit.

12. The photonic processor of claim 11, wherein the second photonic circuit is further configured to split at least one of the corresponding processed versions of the plurality of keys before the updated key is generated.

13. The photonic processor of claim 1, wherein the second photonic circuit comprises at least one of: a plurality of photonic components, a plurality of photonic logic supergates, a plurality of photonic regenerator stages, a plurality of photonic logic adder gates, a plurality of bit corrector gates, a plurality of photonic majority logic gates, a plurality of photonic choose logic gates, and at least one photonic splitter coupled to at least one of the plurality of the photonic logic adder gates.

14. The photonic processor of claim 13, wherein the plurality of photonic components comprises at least one of: a plurality of three-dimensional layout components, a plurality of photonic crossing devices, a plurality of photonic logic gates, a plurality of photonic wire bonds, and a plurality of optical fibers.

15. The photonic processor of claim 1, wherein the photonic processor is implemented as a silicon photonics platform.

16. A non-transitory computer-readable storage medium comprising stored instructions that, when executed by at least one processor, cause the at least one processor to:
instruct a first photonic circuit of the photonic processor to generate a plurality of new messages based at least in part on a plurality of input messages;
initiate, at a second photonic circuit of the photonic processor during a plurality of operational cycles, reception of the plurality of new messages from the first photonic circuit via a set of optical connections;
instruct, during the plurality of operational cycles, the second photonic circuit to update a plurality of keys based at least in part on the plurality of new messages; and
instruct, after the plurality of operational cycles, the second photonic circuit to generate at least one hash value based on the plurality of keys obtained after the plurality of operational cycles.

17. The computer-readable storage medium of claim 16, wherein the stored instructions comprise further stored instructions that, when executed, cause the at least one processor to:
initiate, at the second photonic circuit during each iteration of a plurality of iterations, reception of a subset of the plurality of new messages from the first photonic circuit via the set of optical connections;
instruct, during each of the plurality of iterations, the second photonic circuit to update the plurality of keys based at least in part on the subset of new messages; and
instruct, after the plurality iterations, the second photonic circuit to generate the at least one hash value based on the plurality of keys obtained after the plurality of iterations.

18. The computer-readable storage medium of claim 16, wherein the stored instructions comprise further stored instructions that, when executed, cause the at least one processor to:
initiate the second photonic circuit to update the plurality of keys over a plurality of pipeline stages of the second photonic circuit based at least in part on a corresponding subset of the plurality of new messages received at each of the plurality of pipeline stages;
instruct an array of photodetectors coupled to the second photonic circuit via another set of optical connections to detect the at least one hash value received at the array of photodetectors via the other set of optical connections; and
instruct an interface circuit coupled to the array of photodetectors to compare the at least one detected hash value with at least one target value.

19. The computer-readable storage medium of claim 16, wherein the stored instructions comprise further stored instructions that, when executed, cause the at least one processor to:
instruct an array of photonic intensity modulators of the photonic processor coupled to the second photonic circuit via another set of optical connections to receive at least a portion of initial key values for the plurality of keys, the portion of initial key values encoded in a plurality of optical wavelengths; and
instruct the array of photonic intensity modulators to send the received portion of initial key values to the second photonic circuit via the other set of optical connections.

20. A method comprising:
generating, by a first photonic circuit of a photonic processor, a plurality of new messages based at least in part on a plurality of input messages;
receiving, at a second photonic circuit of the photonic processor during a plurality of operational cycles, the plurality of new messages from the first photonic circuit via a set of optical connections;
updating, by the second photonic circuit during the plurality of operational cycles, a plurality of keys based at least in part on the received plurality of new messages; and
generating, by the second photonic circuit after the plurality of operational cycles, at least one hash value based on the plurality of keys obtained after the plurality of operational cycles.

* * * * *